United States Patent [19]

Dischert et al.

[11] 4,166,281
[45] Aug. 28, 1979

[54] VIDEO IMAGE HIGHLIGHT SUPPRESSION CIRCUIT WITH DELAYED COMPENSATION

[75] Inventors: Robert A. Dischert, Burlington; Sidney L. Bendell, Riverton, both of N.J.

[73] Assignee: RCA Corporation, New York, N.Y.

[21] Appl. No.: 920,078

[22] Filed: Jun. 28, 1978

Related U.S. Application Data

[63] Continuation of Ser. No. 763,594, Jan. 28, 1977, abandoned.

[30] Foreign Application Priority Data

Dec. 13, 1976 [GB]  United Kingdom ............... 51834/76
Jan. 25, 1977 [GB]  United Kingdom ............... 02934/77

[51] Int. Cl.² ............................................. H04N 5/19
[52] U.S. Cl. .................................................. 358/219
[58] Field of Search ................... 358/41, 219, 223, 50; 315/10

[56] References Cited

U.S. PATENT DOCUMENTS

| | | | |
|---|---|---|---|
| 3,315,034 | 4/1967 | White ............................. | 358/219 X |
| 3,955,116 | 5/1976 | van den Berg ..................... | 315/10 |
| 3,975,675 | 8/1976 | Sato et al. ....................... | 315/10 |
| 3,999,011 | 12/1976 | Sato et al. ...................... | 358/219 |

*Primary Examiner*—Robert L. Richardson
*Assistant Examiner*—Aristotelis M. Psitos
*Attorney, Agent, or Firm*—Eugene M. Whitacre; Paul J. Rasmussen; Robert L. Troike

[57] ABSTRACT

A suppression circuit processes the video signal from an image pickup tube and develops a control signal indicative of the time duration of the illumination highlights. The control signal is coupled to the normal beam current supply circuit so as to automatically increase the beam current in the presence of an illumination highlight to force the recharging of the target in the area of the highlight. Additional signal processing of the control signal by delay means and waveshaping improves the feedback loop stability and reduces the transient effects of the control signal on beam current crosstalk in the video output signal from the image pickup tube. In a color camera, only one of the three camera tube signals need be used for the highlight detection and generation of the control signal. The control signal may be used for increasing the beam current in each of the three tubes independently.

3 Claims, 4 Drawing Figures

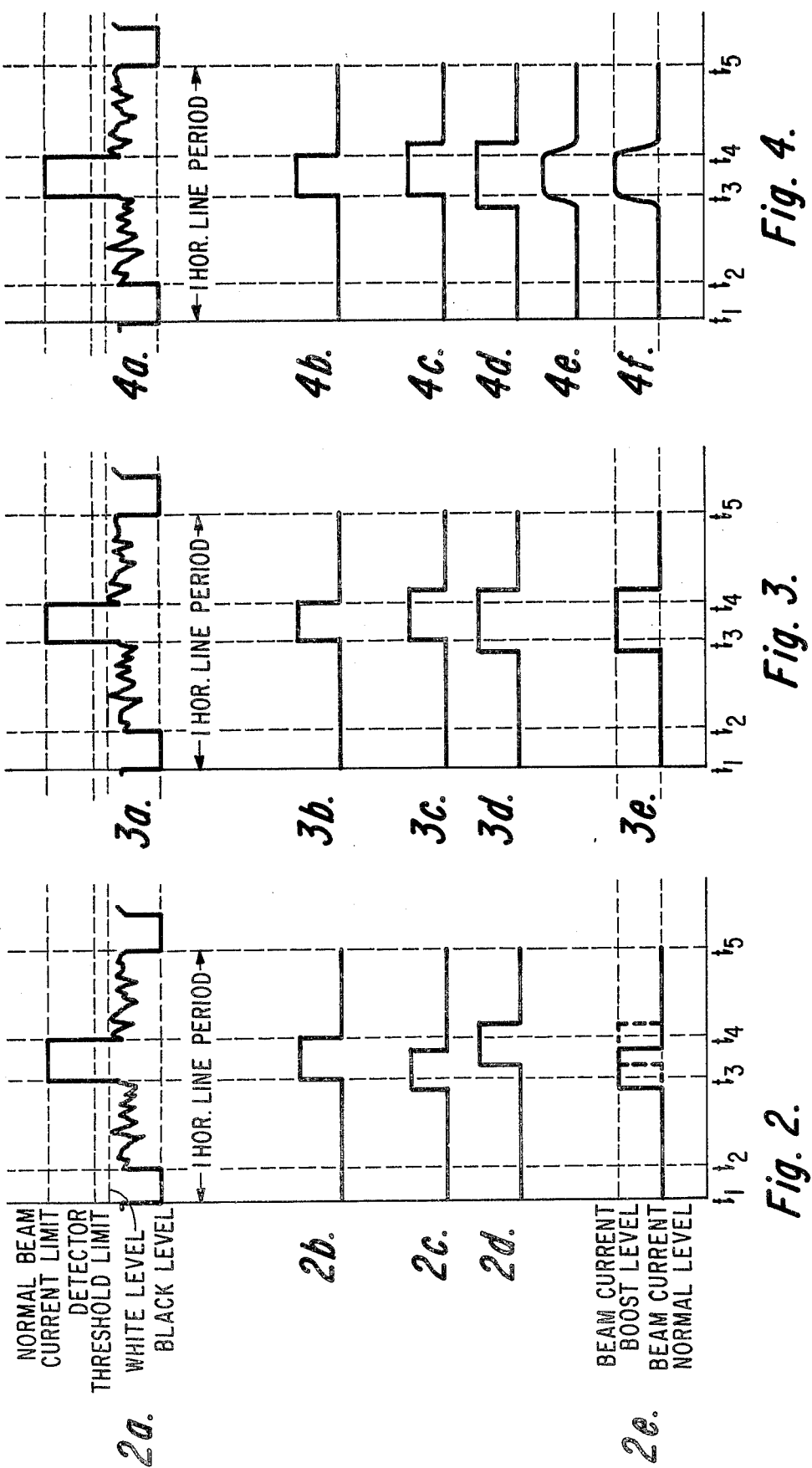

VIDEO IMAGE HIGHLIGHT SUPPRESSION CIRCUIT WITH DELAYED COMPENSATION

This is a continuation of application Ser. No. 763,594, filed 1/28/77 and now abandoned.

BACKGROUND OF THE INVENTION

This invention relates to television camera systems in which a video signal is developed from one or more image pickup tubes and, in particular, to suppression circuits for eliminating from the video signal developed by the image pickup tubes the effect of illumination highlights present in the scene being viewed.

Modern day television cameras include one or more image pickup tubes for developing a video signal from the scene being viewed. The image pickup tube generally comprises an electron gun assembly for generating an electron beam which is used to scan a photoconductive target on which the light from the scene is imaged. Beam deflection coils placed around the pickup tube and driven by horizontal and vertical rate signal waveforms cause the electron beam to scan the photoconductive target in an orderly fashion to develop a video signal representative of the scene by virtue of the electron beam recharging the photoconductive target to cathode potential. The number of image tubes utilized in a television camera generally relates to the form of video signal desired, i.e., a single pickup tube may suffice for a monochrome video signal, while a color video signal generally requires two or more tubes for developing the complete color signal. A typical color camera utilizing image pickup tubes of the above-described form is the RCA TK-76 camera manufactured by the RCA Corporation, Camden, N.J., U.S.A. In the TK-76, the incoming light from the scene is optically split into its red, green and blue components, and each portion is imaged onto the target of individual image pickup tubes for developing the red, green, and blue color portions of a video signal representative of the scene being viewed. The color signals from the image pickup tubes are then processed in known circuitry to form the composite video signal, for example, to NTSC standards.

Image pickup tubes utilizing a photoconductive target on which the light from a scene is imaged, as described above, may develop levels of target voltage modulation, upon exposure to above normal illumination highlights in the scene, that cannot be recharged fully by the normal steady state beam current which is used to develop the output video signal from the image pickup tube by recharging the photoconductive target. Where the highlight exposure is relatively intense, for example, as illustrated by a point source of light in the scene, many passes or scans of the target by the beam will be required for complete recharge of the target. If the highlight in question is moving, an effect known as comet-tailing results in which the moving highlight is trailed by a tail of light. In a color camera system, the comet-tailing is particularly troublesome since the comet tails may flare up as spurious bright colors in the final display not related to the highlight or scene background.

SUMMARY OF THE INVENTION

A beam control circuit is provided for suppressing illumination highlights effects in a video output signal representative of a scene being received by an image pickup tube. The image pickup tube includes a cathode and a beam control element for controlling an electron beam used to scan a target electrode. The scanning of the target electrode produces an electrical output signal in the form of a video signal representative of the scene being received by the pickup tube by recharging the target electrode. The circuit comprises detector means coupled to the image pickup tube for comparing the electrical output signal of the image pickup tube with a first reference signal for developing a bi-level control signal having a leading and a trailing edge and a time duration equal to the time duration of said illumination highlights. Delay means are coupled to the detector means for delaying the control signal for positioning said control signal in time with respect to the illumination highlights. Biasing means coupled to the image pickup tube control element are responsive to a second reference signal for developing a steady state beam current in the image pickup tube. Control means, responsive to the delayed control signal, are coupled to the biasing means for increasing the steady state beam current in the presence of the illumination highlights during the scanning of the target electrode so as to increase the recharge rate of the target electrode.

A further feature of the invention provides means for shaping the delayed control signal so as to control the application of the increasing beam current in the image pickup tube.

BRIEF DESCRIPTION OF THE DRAWINGS

FIGS. 2a-2c, 3a-3e, and 4a-4f illustrate waveforms depicting the operation of the system of FIG. 1.

DESCRIPTION OF THE INVENTION

Figure 1:
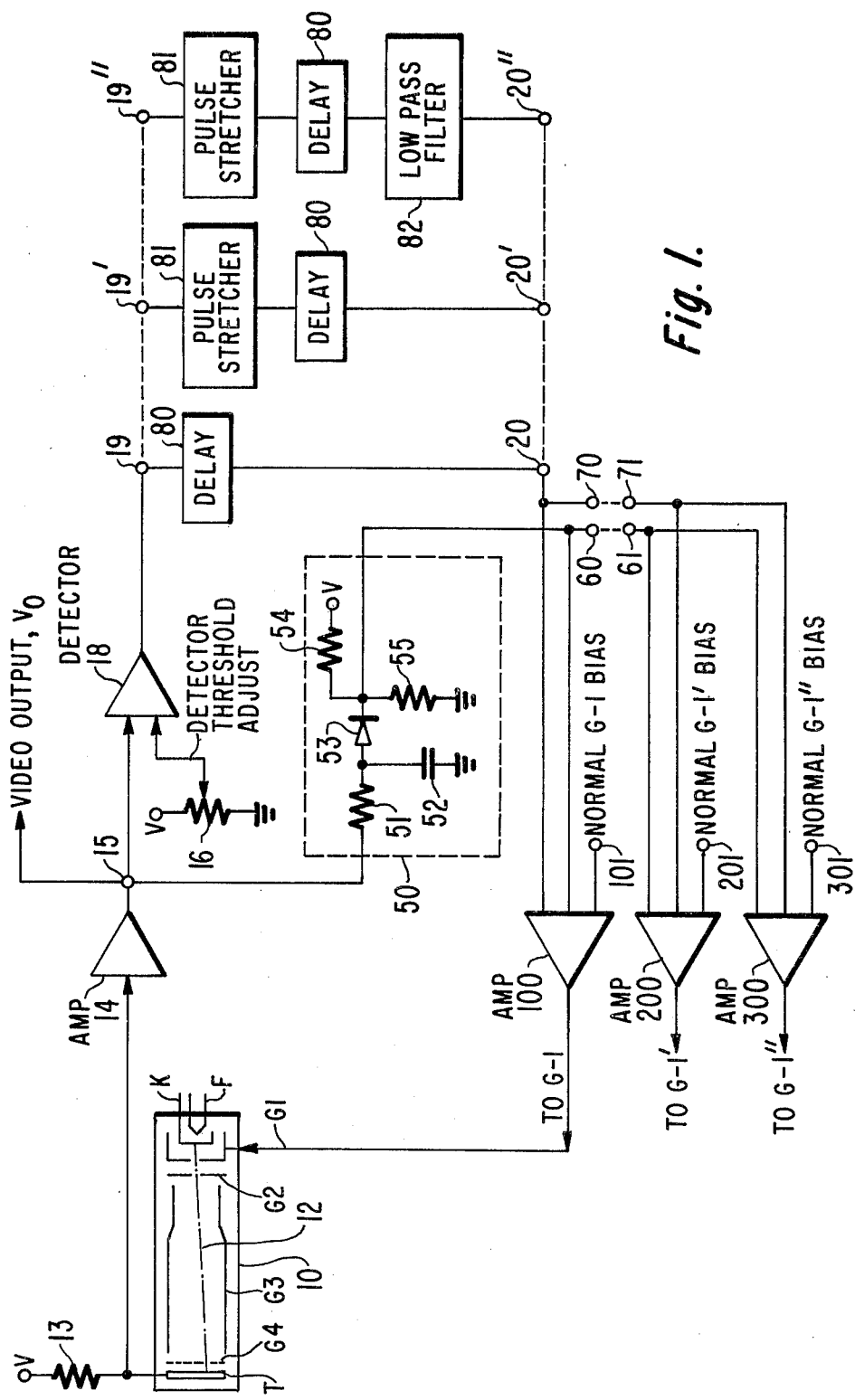
FIG. 1 is a block diagram partially in schematic form of a system embodying the present invention.

In FIG. 1, an image pickup tube 10 is shown in diagrammatic form having a filament F for heating a thermionic cathode K to produce an electron beam 12. Control electrodes $G_1$, $G_2$, $G_3$ and $G_4$ provide the electron optics necessary to shape and direct electron beam 12 toward the target T. The line and field deflection coils as well as the operating potential sources for the recited elements of pickup tube 10 not necessary for an understanding of the invention have been omitted. The target T, which comprises a transparent conductive plate covered by a photoconductive layer, forms a myriad of capacitors on which the light from the scene is imaged. The photoconductive layer is energized by a potential V coupled to the photoconductive layer by means of resistor 13. As the electron beam is scanned over the target assembly by the horizontal and vertical deflection fields, the beam recharges the capacitor formed by the target layer that was discharged by the incoming light, thereby modulating the current in resistor 13. The junction of target electrode T and resistor 13 provides a pickup tube signal output terminal, which is, in turn, coupled to the input terminal of a video processing amplifier 14. The output terminal 15 of video amplifier 14 provides a video output signal $V_o$ which is further processed within the camera system and subsequent studio apparatus for transmission to the viewer. The output terminal 15 of amplifier 14 is further coupled to one input of a threshold detector 18 and to the input terminal of a duty cycle detector 50. The other input of detector 18 is coupled to a source of reference potential comprising an adjustable resistor 16 coupled to a source of potential V. The output of detector 18 is coupled via a terminal 19 to the input terminal of a signal delay means 80, the output terminal of delay line 80 is coupled to one input terminal of a linear amplifier 100 via a terminal 20. A second input terminal of amplifier 100 is coupled to a source 101 of normal $G_1$ bias. Duty cycle detector 50 coupled to a third input terminal of amplifier 100 comprises an integrating circuit consisting of input resistor 51 and capacitor 52 coupled to a diode 53, which is biased by a voltage divider consisting of resistors 54, 55 coupled to a source of potential V. The output of amplifier 100 is coupled to the $G_1$ electrode terminal of image pickup tube 10.

Insofar as described, the circuit of FIG. 1 operates in the following manner. The normal $G_1$ bias, coupled to amplifier 100, establishes a steady state beam current in the image pickup tube 10 by means of control electrode $G_1$. The related operating potentials for remaining elements of pickup tube 10, although not shown, are understood to be established in accordance with known practice as, for example, in the aforementioned TK-76 camera. The output video signal from the junction of resistor 13 and target T is amplified in amplifier 14 and appears at terminal 15 in the form illustrated in waveform 2a. Waveform 2a illustrates a video signal of one horizontal line, having a blanking interval $t_1$-$t_2$ and an image portion $t_2$-$t_5$. The normal amplitude of the video signal extends from black level corresponding to no light to white level corresponding to maximum white light. A highlight occurring during the image portion of the horizontal line is shown by the time $t_3$-$t_4$. The amplitude of the video signal during the highlight is limited, as illustrated in waveform 2a by the maximum beam reserve current, which is typically two times the steady state normal beam current. The video signal from output terminal 15 is applied to one input terminal of detector 18 (which may be constructed, for example, with a Motorola M1514 integrated circuit), where it is compared with a reference potential established, as illustrated in waveform 2a, as just exceeding the maximum white level of the output video signal. The output of detector 18 is a constant amplitude pulse having a leading and trailing edge, as illustrated in waveform 2b. The amplitude of the pulse from detector 18 is a fixed level determined by the saturation limit of detector 18 and having a duration equal to highlight period $t_3$-$t_4$. The constant amplitude pulse from detector 18 is coupled to the input terminal of a signal delay means 80, the delay time of which is adjusted to be just short of one full horizontal line time, as illustrated in waveform 2c. Alternatively, the signal delay of delay means 80 may be adjusted to just exceed one full horizontal line time, as illustrated in waveform 2d, or if desired at any intermediate point, as well as multiples of horizontal lines. The output terminal of delay means 80 is coupled to one input of amplifier 100, where it is utilized to increase the beam current established by the normal $G_1$ bias for image pickup tube 10, as illustrated by waveform 2e. Waveform 2e illustrates the normal $G_1$ bias level, which establishes the beam current in tube 10, being increased to a preset level by the effect of the delayed or advanced constant amplitude pulse from detector 18. The beam current increase, as shown in waveform 2c, is made sufficiently high in amplitude, that is, in excess of the normal beam reserve current of two times normal beam current, to increase the recharge rate of the target electrode T of tube 10 in the area of the highlight. Detector 18 generates a constant level output signal pulse, regardless of the amplitude of the video signal in the presence of a highlight, and, in turn, a fixed beam current boost, whenever the minimum threshold is exceeded so as to reduce any inherent tendency of system oscillation, while the delay or advance provided by delay means 80 virtually eliminates any tendency of the positive feedback loop to electrode $G_1$ of tube 10 to cause system oscillation. Although the increase in beam current occurs approximately one horizontal line later in time, an effectively complete recharge of the target area on the adjacent line is achieved due to an increase in beam spot size by virtue of the increased beam current.

The use of delay means 80 to position the output pulse of detector 18 may be advantageously utilized to further improve the system of FIG. 1. As previously described, the output pulse of detector 18 is a bi-level pulse with leading and trailing edges which affect the transient time of the beam current increase. This relatively fast rise and fall of the beam current coincident with the highlight duration may, under some conditions of image pickup tube operation, produce an undesirable edge effect to appear in the final video display at the edges of the illumination highlight. This edge effect may be reduced by a broadening of the output pulse of detector 18 in the following manner. In FIG. 1, delay means 80, coupled between terminals 19-20, is preceeded by a pulse stretcher 81, as illustrated by the dotted connection to terminals 19'-20'. Pulse stretcher 81 may be constructed, for example, in the form of a monostable multivibrator. The operation of FIG. 1, with the addition of pulse stretcher 81, as indicated by the dotted connection to terminals 19'-20', is illustrated in FIGS. 3a-3e, where waveforms 3a and 3b depict a video signal and detector 18 output pulse, as previously described in conjunction with FIGS. 2a and 2b. FIG. 3c illustrates the pulse output of detector 18 being lengthened by the operating time of pulse stretcher 81. The lengthened pulse output of pulse stretcher 81 is then delayed by delay means 80, the time delay of which is adjusted to be just short of a full horizontal line time by one-half the time that the detector output pulse was lengthened. The output of delay line 80 at terminal 20' is now a broadened pulse, centered on the time period $t_3$-$t_4$ of the illumination highlight, so as to avoid coincidence between the video signal increase, due to the illumination highlight and the leading and trailing edges of the beam current increase, shown in FIG. 3e, thus minimizing possible beam current signal crosstalk into the output video signal from the image pickup tube.

The relatively fast rise and fall of the beam current signal may also cause beam current signal crosstalk into the video output signal due to interelectrode capacity between the electron gum elements. This form of crosstalk may be minimized, as shown in FIG. 1, by the addition of waveshaping means following the delay means 80, as illustrated by the series combination of pulse stretcher 81, delay means 80, and low pass filter 82 coupled between terminals 19" and 20". The operation of FIG. 1, utilizing the structure shown by the dotted connection to terminals 19" and 20", is illustrated by the waveforms of FIGS. 4a-4f, where FIGS. 4a, 4b, 4c and 4d depict an operation of FIG. 1 corresponding to that described in conjunction with the waveforms of FIGS. 3a, 3b, 3c and 3d. FIG. 4e illustrates the waveshaping of the leading and trailing edges of the broadened and delayed output pulse of detector 18 by low pass filter 82. The resultant beam current increase signal, as illustrated in the waveform of FIG. 4f is a broadened waveform having gradually rising and falling leading and trailing edges with the maximum level corresponding to maximum beam current increase centered on the time period $t_3$-$t_4$. It is, of course, possible to provide in place of low pass filter 82 any desired waveshaping network for the leading and trailing edges of the control pulse, as well as any degree of positioning of the control pulse by adjustment of the time delay of delay means 80.

The invention, as described, provides for the elimination of comet tailing in the presence of illumination highlights in the scene by using an increased beam current only when necessary during the actual scanning of the target electrode, thereby keeping the average beam current at a level very near the minimum beam current established by the normal $G_1$ bias level. This lower average beam current greatly increases the operating life of the image pickup tube.

In the event the camera is directed toward an overly bright light source, for example, toward a sun lit sky without attendant light reduction into the camera, it is possible for the circuit of FIG. 1 to maintain the beam current at its boosted level for an extended period of time, which would be detriment to the life of the pickup tube due to the increased target dissipation. The use of duty cycle detector 50 will prevent such an occurrence as follows. The video output signal from terminal 15 is coupled to an integrating circuit comprising a resistor 51 and capacitor 52, which charges to the average potential of the signal reflecting the highlight portion of the signal. If the highlight is overly extended in duration, for example, if the entire target area is overly illuminated, the threshold of diode 53 established by voltage divider 54, 55 is exceeded and the resultant lowered output potential is coupled to amplifier 100 to disable the beam current boost increase, thus protecting the image pickup tube from excessive dissipation.

The invention insofar as described, depicts the operation with a single image pickup tube, as would be the application in a monochrome camera system. The invention is readily and advantageously adapted to a color camera system in the following manner. As previously mentioned, in a color camera, the incoming light from the scene is optically split into one or more color components, which are imaged onto individual image pickup tubes. Since the light reaching each of the image pickup tubes is from the same light source, an illumination highlight in the scene will simultaneously appear at the same relative position in all three image tubes. Therefore, a control signal indicating an illumination highlight derived from any one of the multiple image pickup tubes can be utilized to increase the beam current in all of the pickup tubes at the same time. This is illustrated in the embodiment of FIG. 1 by the extending of the delayed; stretched and delayed; or stretched, delayed and waveshaped output of detector 18 to amplifiers 200 and 300 which control the beam current levels via $G_1'$ and $G_1''$ of the other color component image pickup tubes (not shown) via a connection between terminals 70-71, shown in dotted form. In normal practice, it is desirable to derive the highlight control signal from the green light component as this color component generally contains a higher percentage of the luminance component of the scene light. Therefore, the output of amplifier 100 would normally be coupled to the $G_1$ control electrode of the green responsive color tube, while the output of amplifiers 200 and 300 would be coupled to $G_1'$ and $G_1''$ of the red and blue tubes, respectively. The use of separate amplifiers 100, 200, 300 for each of the tubes allows the normal $G_1$ bias and subsequent beam current boost to be tailored for the individual response of each image tube to its received color component. In a similar fashion, the output signal from overload duty cycle detector 50 is coupled to amplifiers 200 and 300 via terminals 60-61, as shown by the dotted connection to provide overload beam current increase protection for a multiple pickup tube camera configuration.

What is claimed is:

1. A beam control circuit for suppressing illumination highlights effects in a video output signal of a scene being received by an image pickup tube, said image pickup tube including a cathode, and a beam control element for controlling an electron beam used to scan a target electrode, said scanning producing an electrical output signal in the form of a video signal representing the scene being received by said pickup tube by recharging said target electrode, comprising:

detector means coupled to said image pickup tube and responsive to the output therefrom exceeding a given level in a television line indicative of highlights for providing a control signal having a leading and trailing edge and a time duration equal to the time duration of said illumination highlights;

means coupled to said detector means for delaying said control signal a time period slightly less than a horizontal line time period or multiple thereof so as to position said control signal slightly advanced of said illumination highlights on the following lines; and biasing means coupled to said image pickup tube control element for developing a steady state beam current in said image pickup tube and means coupled to said biasing means being responsive to said delayed control signal for increasing said steady state beam current a fixed predetermined amount in the presence of said illumination highlights during said scanning so as to increase the recharge rate of said target electrode without causing oscillations.

2. A beam control circuit for suppressing illumination highlights effects in a video output signal of a scene being received by an image pickup tube, said image pickup tube including a cathode, and a beam control element for controlling an electron beam used to scan a target electrode, said scanning producing an electrical output signal in the form of a video signal representative of the scene being received by said pickup tube by recharging said target electrode comprising:

detector means coupled to said image pickup tube and responsive to said output therefrom exceeding a given level for providing a control signal having a leading and a trailing edge and a time duration equal to the time duration of said illumination highlights;

means coupled to said detector means for increasing the width of said control signal;

means coupled to said width increasing means for delaying said increased width control signal so as to position said increased width control signal in time with respect to said illumination highlights;

biasing means coupled to said image pickup tube control element for developing a steady state beam current in said image pickup tube; and means coupled to said biasing means responsive to said delayed and increased width control signal for increasing said steady state beam current a predetermined amount in the presence of said illumination highlights during said scanning so as to increase the recharge rate of said target electrode.

3. A beam control circuit for suppressing illumination highlights effects in a video output signal of a scene being received by an image pickup tube, said image pickup tube including a cathode, and a beam control element for controlling an electron beam used to scan a target electrode, said scanning producing an electrical output signal in the form of a video signal representative of the scene being received by said pickup tube by recharging said target electrode, comprising:

detector means coupled to said image pickup tube and responsive to the output therefrom exceeding a given level indicative of illumination highlights for providing a control signal having a leading and trailing edge and a time duration equal to the time duration of said illumination highlights;

means coupled to said detector means for increasing the width of said control signal;

delay means coupled to said width increasing means for delaying said increased width control signal so as to position said increasing width control signal in time with respect to said illumination highlights;

waveshaping means coupled to said delay means for modifying said leading and said trailing edges of said control signal;

biasing means coupled to said image pickup control element for developing a steady state beam current in said image pickup tube; and means coupled to said biasing means being responsive to said delayed, increased width, and waveshaped control signal for increasing said steady state beam current a predetermined amount in the presence of said illumination highlights during said scanning so as to increase the recharge rate of said target electrode.

* * * * *